US008068298B2

(12) United States Patent
Shen et al.

(10) Patent No.: US 8,068,298 B2
(45) Date of Patent: Nov. 29, 2011

(54) HARMONIC SELECTION FOR TRACK FOLLOWING ON A HARD DISK DRIVE

(75) Inventors: Jr-Yi Shen, Sunnyvale, CA (US); Zhi Wang, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/429,417

(22) Filed: Apr. 24, 2009

(65) Prior Publication Data
US 2010/0271723 A1 Oct. 28, 2010

(51) Int. Cl.
G11B 27/36 (2006.01)
G11B 21/02 (2006.01)
(52) U.S. Cl. ............................. 360/31; 360/75
(58) Field of Classification Search .................. None
See application file for complete search history.

(56) References Cited

U.S. PATENT DOCUMENTS

| | | | | |
|---|---|---|---|---|
| 5,608,586 | A * | 3/1997 | Sri-Jayantha et al. | 360/77.04 |
| 5,930,067 | A * | 7/1999 | Andrews et al. | 360/77.04 |
| 5,949,605 | A | 9/1999 | Lee et al. | |
| 6,310,742 | B1 | 10/2001 | Nazarian et al. | |
| 6,347,017 | B1 * | 2/2002 | Carlson | 360/77.04 |
| 6,549,349 | B2 * | 4/2003 | Sri-Jayantha et al. | 360/31 |
| 6,804,079 | B2 | 10/2004 | Hsin | |
| 6,819,521 | B2 | 11/2004 | Ho et al. | |
| 6,867,943 | B2 | 3/2005 | Harmer et al. | |
| 6,937,424 | B2 | 8/2005 | Chang et al. | |
| 6,947,249 | B1 | 9/2005 | Hargarten et al. | |
| 6,963,466 | B2 * | 11/2005 | Baum et al. | 360/77.04 |
| 6,999,267 | B1 | 2/2006 | Melkote et al. | |
| 7,088,547 | B1 | 8/2006 | Wang et al. | |
| 7,193,808 | B2 * | 3/2007 | Takaishi | 360/77.04 |
| 7,330,332 | B2 | 2/2008 | Baek et al. | |
| 7,345,842 | B2 | 3/2008 | Chang et al. | |
| 7,372,659 | B2 * | 5/2008 | Takaishi | 360/77.04 |
| 7,738,211 | B2 * | 6/2010 | Oyamada et al. | 360/75 |
| 2003/0133220 | A1 | 7/2003 | Hsin | |

OTHER PUBLICATIONS

Onuki, et al., "Compensation for Repeatable Tracking Errors in Hard Drives Using Discrete-Time Repetitive Controllers", *IEEE/ASME Transactions on Mechatronics*, vol. 6, No. 2, (Jun. 2001),132-136.
Wu, et al., "Repeatable Runout Compensation for Hard Disk Drives Using Adaptive Feedforward Cancellation", *American Control Conference*, (Jun. 2006),14-16.
Zhang, et al., "A Novel Adaptive Feedforward Compensation Algorithm for Hard Disk Drive", *IEEE International Conference on Mechatronics and Automation*, (Jun. 2006),1275-1279.

* cited by examiner

*Primary Examiner* — K. Wong

(57) ABSTRACT

Harmonic selection for track following is described for a hard disk drive comprising at least one magnetic disk capable of storing data and spinning, a controller capable of controlling a read/write head capable of reading and writing data while following a track on a surface of the at least one magnetic disk, and a memory device capable of storing data relating to the operation of the hard disk drive. A drive function test on the hard disk drive is performed, during which harmonic frequencies are identified which cause disturbances for the hard disk drive. Data regarding the harmonic frequencies which cause the greatest disturbances for the hard disk drive is stored in the memory device. The data regarding the harmonic frequencies which cause the greatest disturbances is forwarded to the controller upon the at least one magnetic disk spinning.

20 Claims, 3 Drawing Sheets

200

```
┌─────────────────────────────────────────────────────────────┐
│ Harmonic frequencies which cause disturbances for the hard  │
│   disk drive are identified while a drive function test is  │
│              performed on the hard disk drive.              │
│                            202                              │
└─────────────────────────────────────────────────────────────┘
                              │
                              ▼
┌─────────────────────────────────────────────────────────────┐
│  Data regarding the harmonic frequencies which cause the    │
│  greatest disturbances for the hard disk drive is stored,   │
│         the data being stored in the memory device.         │
│                            204                              │
└─────────────────────────────────────────────────────────────┘
                              │
                              ▼
┌─────────────────────────────────────────────────────────────┐
│   The data regarding the harmonic frequencies which cause   │
│ the greatest disturbances is forwarded to the controller upon│
│      the at least one magnetic disk being spun.             │
│                            206                              │
└─────────────────────────────────────────────────────────────┘
```

FIG. 2

HARMONIC SELECTION FOR TRACK FOLLOWING ON A HARD DISK DRIVE

BACKGROUND ART

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The basic HDD model uses a read/write head to read and write information or data on a magnetic disk. In some operations, as the magnetic disk spins, the read/write head follows a track or path along the surface of the magnetic disk. Disturbances or deformations, due to mechanical root cause, may occur as the disk spins. These disturbances or deformations cause off-track displacement as the read/write head follows the track along the surface of the magnetic disk. This may lead to inefficiency and errors in reading and writing information or data on the magnetic disk.

BRIEF DESCRIPTION OF THE DRAWINGS

FIG. 2 is a flowchart of a method for manufacturing a hard disk drive in accordance with embodiments of the present invention.

OVERVIEW OF DISCUSSION

Figure 1:
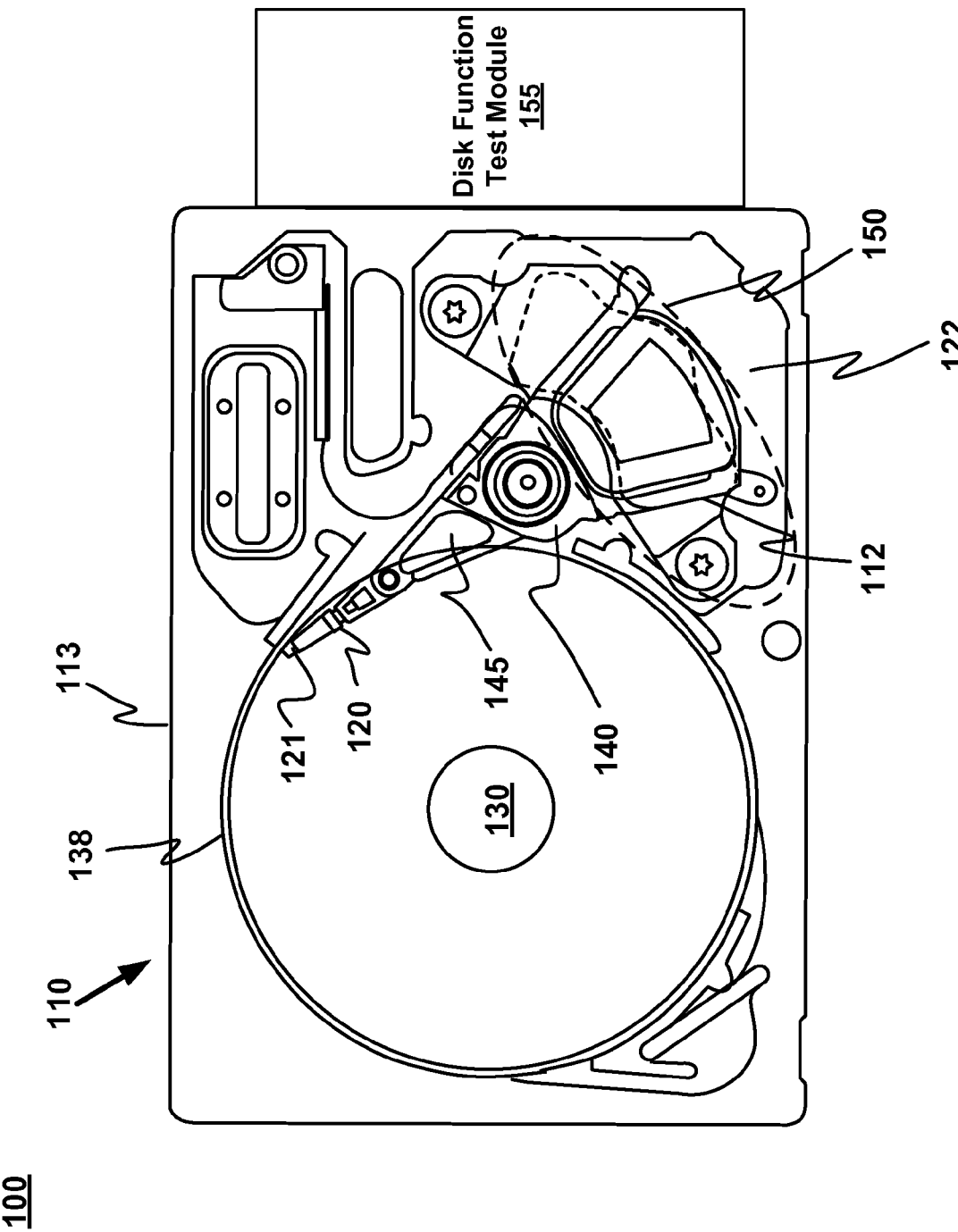
FIG. 1 is a block diagram of an HDD in accordance with embodiments of the present invention.

The discussion will begin with a brief overview of the present invention. The discussion will then focus on a HDD and components connected therewith. The discussion will then focus on embodiments of a method and system for harmonic selection for track following on a HDD.

Embodiments of the present invention are for harmonic selection for track following on a hard disk drive. For example, rotating or spinning magnetic disks, used in a HDD in embodiments of the present invention, may experience harmonic frequencies due to mechanical causes. The read/write head of the HDD may experience errors or distortions while following a track on the surface of the magnetic disk due to these harmonic frequencies. Methods and systems have been devised to compensate for such harmonic frequencies but do not focus on unique harmonic frequencies associated with an individual HDD.

Each individual disk of a HDD may experience unique harmonic frequencies. Embodiments of the present invention are directed to testing and obtaining information and data regarding harmonic frequencies unique to individual HDDs. In various embodiments, the information and data is then stored in components of the HDD and used to compensate for harmonic frequencies each time the HDD is operated. In various embodiments, the testing and obtaining of data and information relating to harmonic frequencies of individual HDDs may be performed during the manufacture phase of the HDD. In one embodiment, the testing and obtaining of information and data need not be performed again after the manufacture phase of the HDD.

The terms harmonic frequencies, as used throughout this document, refer to disturbances that the magnetic disk encounters as it spins or rotates. Such harmonic frequencies may be measured by their amplitude. The term harmonic frequencies may be used interchangeably with the terms harmonic disturbances and disturbances.

DESCRIPTION OF EMBODIMENTS

Reference will now be made in detail to various embodiments of the present invention. While the invention will be described in conjunction with these embodiments, it should be understood that the described embodiments are not intended to limit the invention to these embodiments. On the contrary, the invention is intended to cover alternatives, modifications and equivalents, which may be included within the spirit and scope of the invention as described in the various embodiments and as defined by the appended claims.

Furthermore, in the following description of embodiments, numerous specific details are set forth in order to provide a thorough understanding of various embodiments of the present invention. However, it will be recognized by one of ordinary skill in the art that embodiments of the present invention may be practiced without these specific details. In other instances, well known methods, procedures, components, and circuits have not been described in detail as not to unnecessarily obscure aspects of embodiments of the present invention.

Operation

The basic HDD model includes a magnetic storage disk or hard disk that spins at a designed rotational speed. An actuator arm with a suspended slider is utilized to reach out over the disk. The slider is coupled with a suspension that supports both the body of the slider and a head stack assembly that has a magnetic read/write transducer or head or heads for reading/writing information to or from a location on the disk.

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, embodiments of the present technology are independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 145. When a number of actuator arms 145 are present, they are usually represented in the form of a comb that is movably or pivotally mounted to base/housing 113. A controller 150 is also mounted to base 113 for selectively moving the actuator arms 145 relative to the disk 138. Actuator assembly 140 may be coupled with a connector assembly, such as a flex cable to convey data between arm electronics and a host system, such as a computer, wherein HDD 110 resides.

In one embodiment, each actuator arm 145 has extending from it at least one cantilevered integrated lead suspension (ILS) 120. The ILS 120 may be any form of lead suspension that can be used in a data access storage device. The level of integration containing the slider 121, ILS 120, and read/write head is called the head stack assembly.

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 145 opposite the head stack assemblies. Movement of the actuator assembly 140 causes the head stack assembly to move along radial arcs across tracks on the surface of disk 138. Memory device 122 is capable of storing electronic data that can be used in the operation of HDD 110. Controller 150, and other components of HDD 110, has the ability to access memory device 122 to receive information, data, instruction or commands related to its operation. In one embodiment, memory device 122 is capable of receiving storing data from disk function test module 155.

In one embodiment, HDD 110 is coupled with drive function test module (DFTM) 155. In one embodiment, DFTM 155 is not coupled with a complete hard disk drive, but only with components of the hard disk drive including disk 138 and memory device 122. It should be appreciated that DFTM 155 is a hardware device and is capable of executing computer related commands. In one embodiment, DFTM 155 is capable of controlling the spin of disk 138. In one embodiment, DFTM 155 is capable of obtaining measurements regarding the physical behavior of disk 138. For example, in one embodiment, DFTM 155 is capable of measuring harmonic disturbances or harmonic frequencies of disk 138 including measuring the amplitude of the harmonic frequencies. In one embodiment, DFTM 155 is capable of identifying a plurality of harmonic frequencies causing disturbances as disk 138 spins.

In one embodiment, DFTM 155 is capable of ranking information regarding the plurality of harmonic frequencies based on the severity of disturbance the harmonic frequency is causing disk 138. In one embodiment, DFTM 155 is capable of generating information regarding the harmonic frequencies causing the greatest disturbances to disk 138. Such information may be based on a discrete number of harmonic frequencies. For example, in one embodiment, the information is the amplitude of the harmonic frequencies. In one embodiment, the information is the magnitude of the disturbance experienced by disk 138 at a given harmonic frequency. In one embodiment, information regarding ten harmonic frequencies is selected from the information generated, the ten harmonic frequencies being the ten harmonic frequencies causing the greatest disturbance to disk 138. In one embodiment, DFTM 155 is capable of forwarding information or data regarding harmonic frequencies to memory device 122. In one embodiment, DFTM 155 is capable of carrying out its functions and operation at a given temperature. It should be appreciated that DFTM may be capable of performing other testing and calibrating in relation to HDD 110 or any of its components.

In one embodiment, disk 138 experiences track mis-registration error (TMR) which is a measurement of how far the read/write head deviates from the center of the track as the disk spins, this is also known as off-track displacement. In one embodiment, an instance of TMR is repeated, in the same location on the track, each instance disk 138 spins, this is known as repeatable runout (RRO) and is harmonic in nature. In one embodiment, TMR and RRO are caused by mechanic disturbances. In one embodiment, disk 138 experiences disk flutter induced RRO as a form of mechanical disturbance. In one embodiment, disk flutter occurs when the natural frequency of disk 138 vibrations align with the motor harmonic excitation. In one embodiment, disk flutter results in disk 138 moving back and forth, or up and down, in a direction perpendicular to the plane in which disk 138 is spinning. It should be appreciated that disk flutter can result in different modes and shapes of disk vibration. It should also be appreciated that disk flutter may vary in disks of the same design and manufacture. Therefore it is desirable to select individual harmonic frequencies to compensate for in an individual HDD.

In one embodiment, disk 138 experiences clamp distortion induced RRO, which is another cause of mechanical disturbances to disk 138. In one embodiment, clamp distortion induced RRO is caused by the screws used to mount disk 138 to the HDD assembly. In one embodiment, a clamp distortion induced RRO occurs in each location on the disk 138 where a mounting screw is applying pressure. In one embodiment, disk 138 experiences both clamp distortion induced RRO and disk flutter induced RRO. It should be appreciated that clamp distortion induced RRO may vary from one disk to another, therefore individual harmonic frequencies should be selected to compensate for an individual HDD.

In one embodiment, to compensate for RRO, including both clamp distortion induced RRO and disk flutter induced RRO, information relating to RRO is stored and forwarded to be used each time the HDD is operated. This forwarding is referred to as RRO feed forwarding (RRO FF). In one embodiment, this information relating to RRO is obtained using DFTM, as described above, during the manufacture phase of HDD 110. In one embodiment, information relating to RRO is obtained individually for each HDD being manufactured.

In one embodiment, the RRO cancelation or compensation takes place by moving the read/write head of the HDD. In one embodiment, this movement of the read/write head is accomplished by moving actuator arms 145 of FIG. 1. In one embodiment, RRO cancelation or compensation is accomplished by using controller 150 of FIG. 1 to move actuator arms 145. Thus by moving the read/write head at appropriate times, RRO cancelation can be accomplished and the read/write head is better able to follow the track along the surface of disk 138.

In one embodiment, information relating to a discrete number of harmonic frequencies unique to an individual HDD are stored and used for RRO cancelation. In one embodiment, well known techniques are used for RRO cancelation. For example, in one embodiment, RRO feed forwarding is used for RRO cancelation. It should be appreciated that RRO feed forwarding is a developed technique in which information regarding RRO is utilized, during the operation of HDD 110, so that the read/write heads follow the track during an RRO disturbance. In one embodiment, the harmonic frequencies with the greatest RRO harmonic amplitudes are selected to be used for RRO cancelation. In one embodiment, ten harmonic frequencies are selected to be used for RRO cancelation. In one embodiment, information regarding harmonic frequencies is obtained at a given temperature. In one embodiment, the given temperature is the temperature at which HDD 110 operates at under normal conditions. In one embodiment, RRO cancelation takes place while HDD 110 is operating under normal condition. Therefore, by obtaining information regarding harmonic frequencies at operational temperatures will reflect harmonic frequencies typically experienced under normal operating conditions. Thus RRO cancelation will be optimal using information regarding harmonic frequencies which is obtained at operational temperatures.

FIG. 2 is a flowchart of method 200 for manufacturing a hard disk drive comprising at least one magnetic disk configured for storing data and for spinning, a controller configured for controlling a read/write head capable of reading and writing data while following a track on a surface of said at least one magnetic disk, and a memory device capable of storing data relating to the operation of said hard disk drive, in accordance with one embodiment of the present invention.

At 202, harmonic frequencies which cause disturbances for the hard disk drive are identified while a drive function test is performed on the hard disk drive.

At 204, data regarding the harmonic frequencies which cause the greatest disturbances for the hard disk drive is stored, the data being stored in the memory device.

At 206, the data regarding the harmonic frequencies which cause the greatest disturbances is forwarded to the controller upon the at least one magnetic disk being spun.

Figure 3:
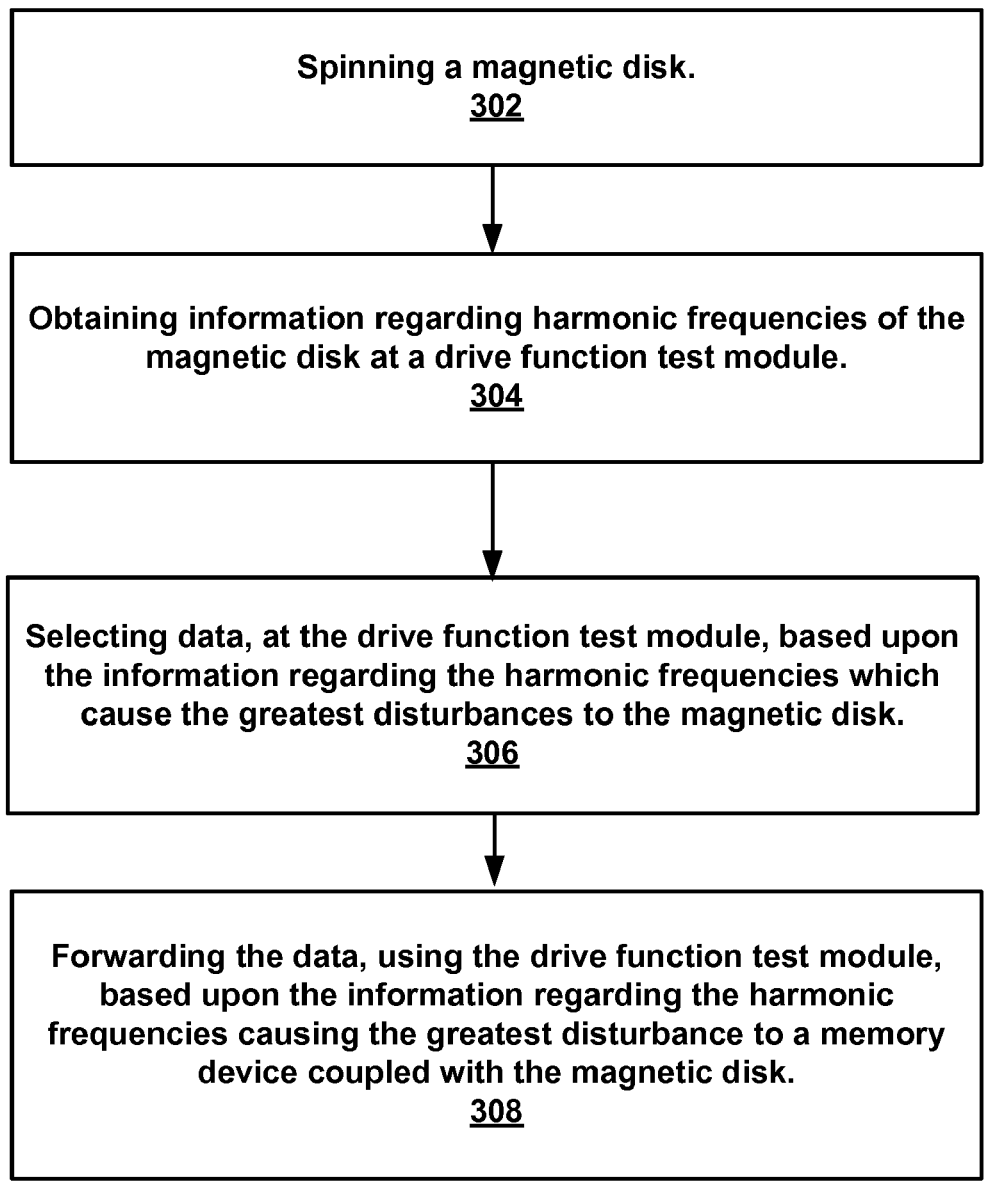
FIG. 3 is a flowchart of a method for testing a disk in accordance with embodiments of the present invention.

FIG. 3 is a flowchart of method 300 for testing a disk in accordance with one embodiment of the present invention.

At 302, a magnetic disk or other rotating storage medium is spun.

At 304, information regarding harmonic frequencies of the magnetic disk is obtained at a drive function test module. In one embodiment, the information is the amplitude of the harmonic frequencies. In one embodiment, the information is the magnitude of the disturbance experienced by the at least one magnetic disk at a given harmonic frequency.

At 306, data is selected, at the drive function test module, based upon the information regarding the harmonic frequencies which cause the greatest disturbances to the magnetic disk. In one embodiment, the data is selected from memory in the drive function test module. In one embodiment, the data is information regarding the amplitude of the harmonic frequencies. In one embodiment, the data is information regarding the magnitude of the disturbance experienced by the at least one magnetic disk at a given harmonic frequency.

At 308, the data is forwarded to a memory device coupled with the magnetic disk, using the drive function test module, based upon the information regarding the harmonic frequencies causing the greatest disturbance. In one embodiment, the data is forwarded to onboard memory which is part of the HDD. In one embodiment, the data is used for RRO cancelation using well known techniques for RRO cancelation as described above.

Thus, embodiments of the present invention provide a harmonic selection for track following on a hard disk drive.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for manufacturing a hard disk drive comprising at least one magnetic disk configured for storing data and for spinning, a controller configured for controlling a read/write head capable of reading and writing data while following a track on a surface of said at least one magnetic disk, and a memory device capable of storing data relating to the operation of said hard disk drive, the method comprising:

while performing a drive function test on said hard disk drive, identifying harmonic frequencies which cause disturbances for said hard disk drive;

storing data regarding said harmonic frequencies which cause the greatest disturbances for said hard disk drive, said data being stored in said memory device; and upon said at least one magnetic disk spinning, forwarding to said controller said data regarding said harmonic frequencies which cause the greatest disturbances.

2. The method of claim 1, further comprising
compensating for said disturbances of said hard disk drive, with said controller, using said data regarding said harmonic frequencies which cause said greatest disturbances, after forwarding said data to said controller upon said at least one magnetic disk spinning.

3. The method of claim 1, wherein said identifying said harmonic frequencies occurs when said hard disk drive is operating at a temperature which said hard disk drive experiences under normal operating conditions.

4. The method of claim 1, wherein said disturbances of said hard disk drive are repeatable track mis-registrations errors which occur during said following said track on said surface of said at least one magnetic disk.

5. The method of claim 1, wherein said disturbances of said hard disk drive are caused by clamp distortion as said at least one magnetic disk spins.

6. The method of claim 1, wherein said disturbances of said hard disk drive are caused by disk flutter as said at least one magnetic disk spins.

7. The method of claim 1, wherein said forwarding to said controller said data regarding said harmonic frequencies which cause said greatest disturbances is accomplished using repeatable runout feed forwarding.

8. The method of claim 1, wherein said storing data regarding said harmonic frequencies which cause said greatest disturbances for said hard disk drive corresponds to storing ten said harmonic frequencies.

9. The method of claim 1, wherein said performing said drive function test on said hard disk drive and said identifying said harmonic frequencies which cause said disturbances for said hard disk drive take place only once during said manufacturing.

10. A disk drive system comprising:
a drive function test module configured to identify harmonic frequencies which cause disturbances for said hard disk drive, rank said harmonic frequencies by amplitude, select top said harmonic frequencies which cause said disturbances, and forward data regarding said top said harmonic frequencies which cause said disturbances;
at least one magnetic disk;
a read/write head configured to read and write data on said at least one magnetic disk by track following on a surface of said at least one magnetic disk;
a controller configured to control the position of said read/write head in relation to said at least one magnetic disk; and
a memory device configured to receive and store said data regarding said top said harmonic frequencies which cause said disturbances.

11. The disk drive system of claim 10, wherein said drive function test module is coupled with said hard disk drive and performs its function only during manufacture of said hard disk drive.

12. The disk drive system of claim 10, wherein said controller is further configured to compensate for said disturbances of said hard disk drive by moving said read/write head, during operation of said hard disk drive, in relation to said at least one magnetic disk based on said data regarding said top said harmonic frequencies which cause said disturbances.

13. The disk drive system of claim 10, wherein said top said harmonic frequencies comprise ten harmonic frequencies.

14. The disk drive system of claim 10, wherein said disturbances for said hard disk drive comprise a repeatable off-track displacement of said read/write head in relation to said track following on said surface of said at least one magnetic disk.

15. The disk drive system of claim 10, wherein said drive function test module is further configured to identify said harmonic frequencies which cause disturbances for said hard disk drive when said hard disk drive is operating at a temperature which said hard disk drive experiences under normal operating conditions.

16. A method for testing a disk comprising:
spinning a magnetic disk;
obtaining information regarding harmonic frequencies of said magnetic disk at a drive function test module;
selecting data, at said drive function test module, based upon said information regarding said harmonic frequencies which cause the greatest disturbances to said magnetic disk; and
forwarding said data, using said drive function test module, based upon said information regarding said harmonic frequencies causing said greatest disturbance to a memory device coupled with said magnetic disk.

17. The method of claim 16, wherein said selecting said data further comprises selecting information regarding ten said harmonic disturbances.

18. The method of claim 16, wherein said obtaining said information further comprises obtaining information regarding said harmonic disturbances that are repeatable as said magnetic disk is spinning.

19. The method of claim 16, wherein said obtaining said information occurs when said hard disk drive is operating at a temperature which said hard disk drive experiences under normal operating conditions.

20. The method of claim 16, wherein said harmonic disturbances are caused by disk flutter.

* * * * *